US012789374B2

(12) United States Patent
Niimura et al.

(10) Patent No.: US 12,789,374 B2
(45) Date of Patent: Nov. 10, 2026

(54) ROBOT TEACHING SYSTEM, PROGRAM, AND PROGRAM EDITING DEVICE

(71) Applicant: FANUC CORPORATION, Yamanashi (JP)

(72) Inventors: Shintaro Niimura, Yamanashi (JP); Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 125 days.

(21) Appl. No.: 18/287,075

(22) PCT Filed: Apr. 30, 2021

(86) PCT No.: PCT/JP2021/017276
§ 371 (c)(1),
(2) Date: Oct. 16, 2023

(87) PCT Pub. No.: WO2022/230202
PCT Pub. Date: Nov. 3, 2022

(65) Prior Publication Data

US 2024/0198520 A1 Jun. 20, 2024

(51) Int. Cl.
*B25J 9/16* (2006.01)

(52) U.S. Cl.
CPC .................................. *B25J 9/1656* (2013.01)

(58) Field of Classification Search
CPC ...... B25J 9/1656; B25J 9/1658; B25J 9/1661; G05B 2219/36041; G05B 2219/40392; G05B 19/42; G05B 19/425; G05B 19/409; G05B 2219/40099; G05B 19/4155
See application file for complete search history.

(56) References Cited

U.S. PATENT DOCUMENTS

| | | | |
|---|---|---|---|
| 9,612,727 B2 | 4/2017 | Saito et al. | |
| 2018/0154517 A1 | 6/2018 | Park et al. | |
| 2018/0267689 A1* | 9/2018 | Winkelmann | ...... G06F 3/04817 |
| 2019/0160662 A1* | 5/2019 | Satou | ....................... B25J 9/163 |

FOREIGN PATENT DOCUMENTS

| | | |
|---|---|---|
| CN | 103862472 A | 6/2014 |
| CN | 108687747 A | 10/2018 |
| CN | 107111300 B | 6/2019 |

(Continued)

OTHER PUBLICATIONS

International Search Report dated Jul. 9, 2021, for International Patent Application No. PCT/JP2021/017276.

(Continued)

*Primary Examiner* — Bao Long T Nguyen
(74) *Attorney, Agent, or Firm* — KARCESKI IP LAW, PLLC

(57) ABSTRACT

A robot teaching system includes a controller via which an operation program for operating a robot is editable, and an operation device that has a teaching button into which teaching content can be inputted and that is configured to connected to at least the controller, the controller effectively switching a teaching operation performed by the teaching button and editing the operation program on the basis of the teaching content inputted in the teaching button when a prescribed teaching command is added to the operation program.

18 Claims, 12 Drawing Sheets

(56) References Cited

FOREIGN PATENT DOCUMENTS

| | | | |
|---|---|---|---|
| CN | 112454371 | A | 3/2021 |
| DE | 69030318 | T2 | 10/1997 |
| DE | 102014216514 | B3 | 9/2015 |
| DE | 102018205209 | A1 | 10/2018 |
| JP | H01286003 | A | 11/1989 |
| JP | H04232510 | A | 8/1992 |
| JP | H08194518 | A | 7/1996 |
| JP | H11207670 | A | 8/1999 |
| JP | 2002120175 | A | 4/2002 |
| JP | 2007242054 | A | 9/2007 |
| JP | 2008142788 | A | 6/2008 |
| JP | 2009181526 | A | 8/2009 |
| JP | 2016130953 | A | 7/2016 |
| JP | 2018015853 | A | 2/2018 |
| JP | 2019018257 | A | 2/2019 |
| JP | 2019034412 | A | 3/2019 |
| JP | 6498366 | B | 4/2019 |
| JP | 2019093491 | A | 6/2019 |
| JP | 2019123075 | A | 7/2019 |
| JP | 2019150919 | A | 9/2019 |
| JP | 2020121347 | A | 8/2020 |
| JP | 2021030397 | A | 3/2021 |

OTHER PUBLICATIONS

Japanese Notice of Reasons for Refusal dated Sep. 26, 2023, for Japanese Patent Application No. 2022-006362.
Japanese Office Action dated Sep. 26, 2023, for Japanese Patent Application No. 2022-006362.
Japanese Search Report by Registered Search Organization dated Sep. 26, 2023, for Japanese Patent Application No. 2022-006362.
German Office Action dated Nov. 6, 2024, for German Patent Application No. 112021007100.9.
Taiwanese Office Action dated Sep. 5, 2024, for Taiwan Patent Application No. 112140935.
Taiwanese Office Action dated Oct. 17, 2025, for Taiwanese Patent Application No. 112140935.
Japanese Office Action dated Sep. 16, 2025, for Japanese Patent Application No. 2022-006362.
Chinese Office Action dated Mar. 12, 2026, for Chinese Patent Application No. 202180097428.0.

* cited by examiner

ROBOT TEACHING SYSTEM, PROGRAM, AND PROGRAM EDITING DEVICE

CROSS-REFERENCE TO RELATED APPLICATION(S)

This is a National Stage Entry into the United States Patent and Trademark Office from International Patent Application No. PCT/JP2021/017276, filed on Apr. 30, 2021, the entire contents of which are incorporated herein by reference.

FIELD OF THE INVENTION

The present disclosure relates to a robot teaching system, a program, and a program editing device.

BACKGROUND OF THE INVENTION

Direct teaching, which involves detecting the force applied by an operator with a built-in sensor and changing the position and posture of the robot according to the magnitude and direction of the detected force, is known (for example, see Japanese Unexamined Patent Application, Publication No. 2019-34412). The operator grasps a handle attached to the wrist tip of the robot, applies a force to the robot, and, at a required position, presses a teaching button near the handle to perform a teaching operation.

SUMMARY OF THE INVENTION

According to an aspect of the present disclosure, there is provided a robot teaching system that includes: a program editing device that can edit an operation program for operating a robot; and an operation device that has a teaching input unit through which teaching content can be input and that can connect to at least the program editing device, in which, when a particular teaching command is added to the operation program, the program editing device enables a teaching operation by means of the teaching input unit and edits the operation program on the basis of the teaching content input through the teaching input unit.

DESCRIPTION OF EMBODIMENT(S) OF THE INVENTION

A robot teaching system 100 according to one embodiment of the present disclosure will now be described with reference to the drawings.

Figure 1:
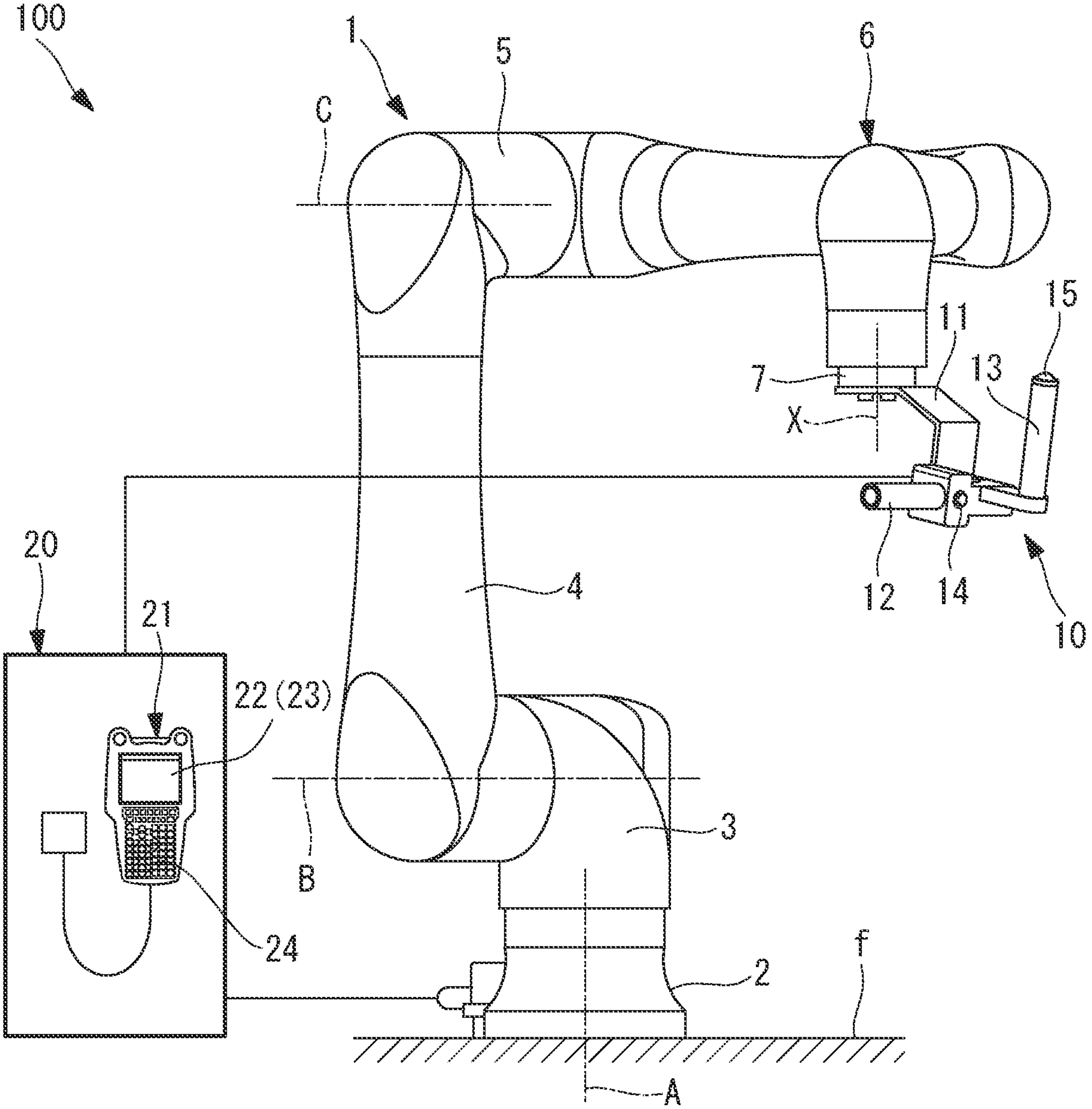
FIG. 1 is an overall diagram illustrating a robot teaching system according to one embodiment of the present disclosure.

As illustrated in FIG. 1, the robot teaching system 100 according to this embodiment includes an operation device 10 attached to a wrist unit 6 of a robot 1, and a controller (program editing device) 20 that is connected to the robot 1 and the operation device 10 and that controls the robot 1.

The robot 1 includes a built-in sensor that detects the force applied to the operation device 10 by the operator, and can be operated by direct teaching that involves changing the position and posture of the robot 1 according to the magnitude and direction of the force detected with the sensor.

In the example illustrated in FIG. 1, the robot 1 is a vertical 6-axis articulated robot that includes a base 2 installed on an installation surface f such as a floor, and a swing barrel 3 rotatably supported about a first axis A with respect to the base 2. The robot 1 also includes a first arm 4 rotatably supported by the swing barrel 3 about a second axis B, a second arm 5 rotatably supported by the first arm 4 about a third axis C, and a 3-axis wrist unit 6 supported by the tip of the second arm 5.

The wrist unit 6 is equipped with a flange 7 that can rotate about a rotational axis (sixth axis) X at the tip. The operation device 10 is equipped with a bracket 11 fixed to the flange 7, handles 12 and 13 fixed to the bracket 11, and an enable switch 15 and a teaching button (teaching input unit) 14 positioned so as to be operatable by means of the hands grasping the handles 12 and 13.

The controller 20 serving as a program editing device of this embodiment is equipped with at least one processor and a memory. The controller 20 is also equipped with a teaching operation panel 21. The teaching operation panel 21 is equipped with a monitor (display unit) 22 that can display the operation program, and a touch panel 23 that can input teaching commands and the like. In addition, the teaching operation panel 21 may also be equipped with a key pad 24.

The controller 20 displays, on a program line on the monitor 22, content input through the touch panel 23 or key pad 24 of the teaching operation panel 21, which enables the editing of the operation program. Furthermore, when an external input teaching command (particular teaching command) is input to the program line of the teaching operation panel 21, the controller 20 enables the teaching operation by means of the teaching button 14 in the operation device 10 attached to the wrist unit 6 of the robot 1. After the teaching operation by means of the teaching button 14 is enabled, the controller 20 edits the operation program on the basis of the teaching content input through the teaching button 14 until the teaching operation by means of the teaching button 14 is disabled.

Figure 2:
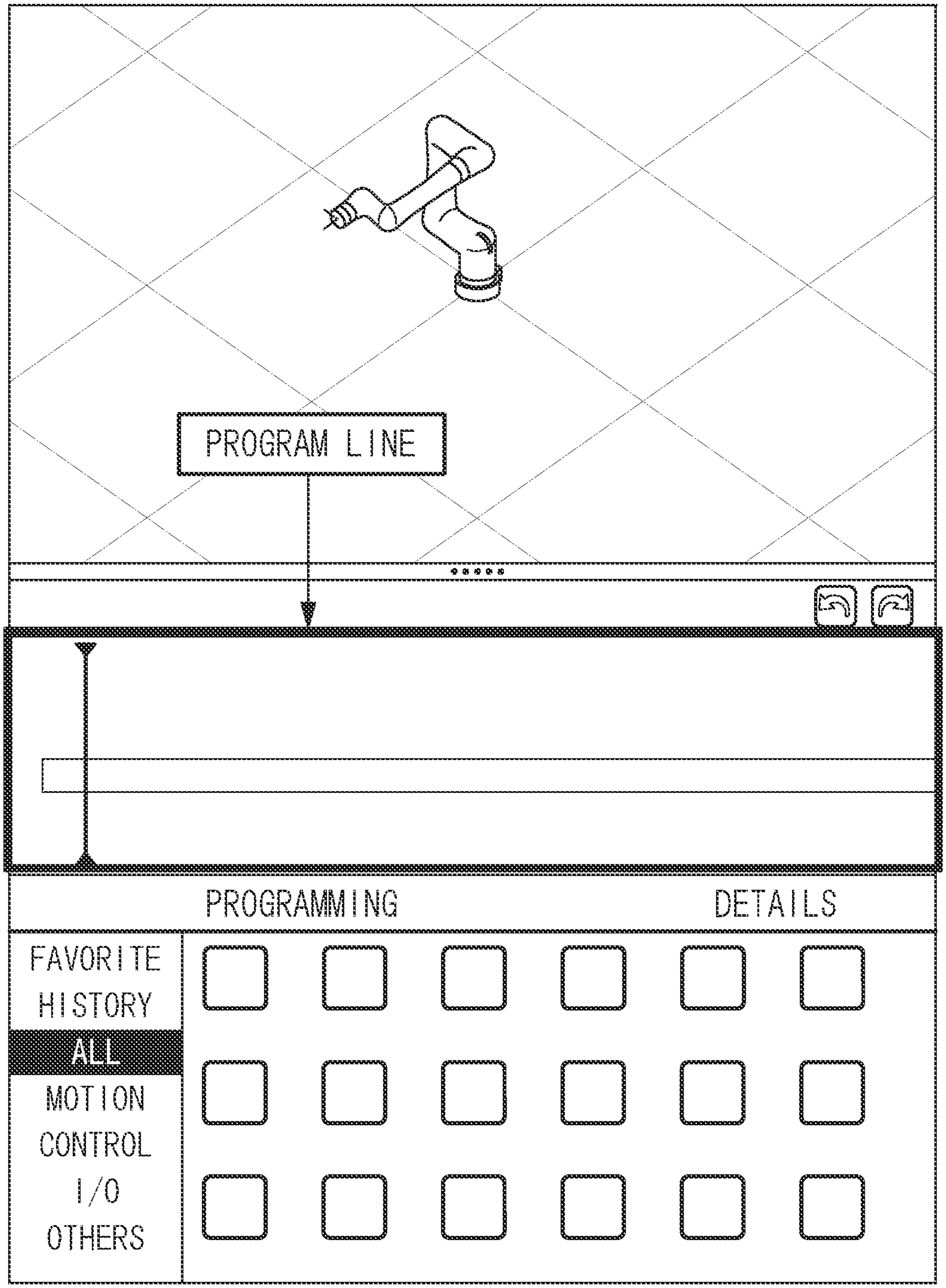
FIG. 2 is a diagram illustrating an example of the operation program editing screen displayed on a monitor in the robot teaching system illustrated in FIG. 1.

For example, when the operator intends to edit the operation program, the operator selects an editing mode in the teaching operation panel 21 of the controller 20. Once the editing mode is selected, as illustrated in FIG. 2, a three-dimensional model of the robot 1, a program line, and icons representing various commands that constitute the operation program are displayed on the monitor 22. The icons can be selected through the touch panel 23 or the key pad 24, and the operation program can be edited by adding the selected icons to the program line and lining up the icons.

If the external input teaching commands are not present in the program line, that is, in the operation program being edited, the controller 20 disables the teaching operation by means of the teaching button 14 in the operation device 10 attached to the tip of the wrist unit 6. Thus, in this state, the teaching content can not be input by operating the operation device 10 by means of pressing the teaching button 14. However, during the time when the enable switch 15 in the operation device 10 is being pressed, the operation of changing the position and posture of the robot 1 by means of direct teaching according to the force applied to the handles 12 and 13 remains enabled.

Figure 3:
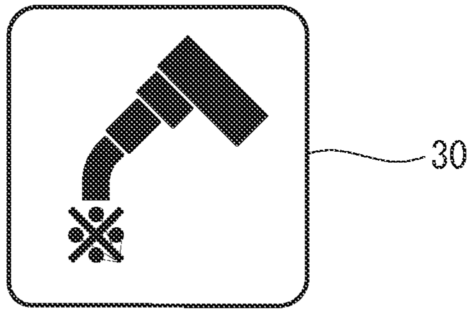
FIG. 3 is a diagram illustrating one example of an icon representing an external input teaching command used in the robot teaching system illustrated in FIG. 1.
Figure 4:
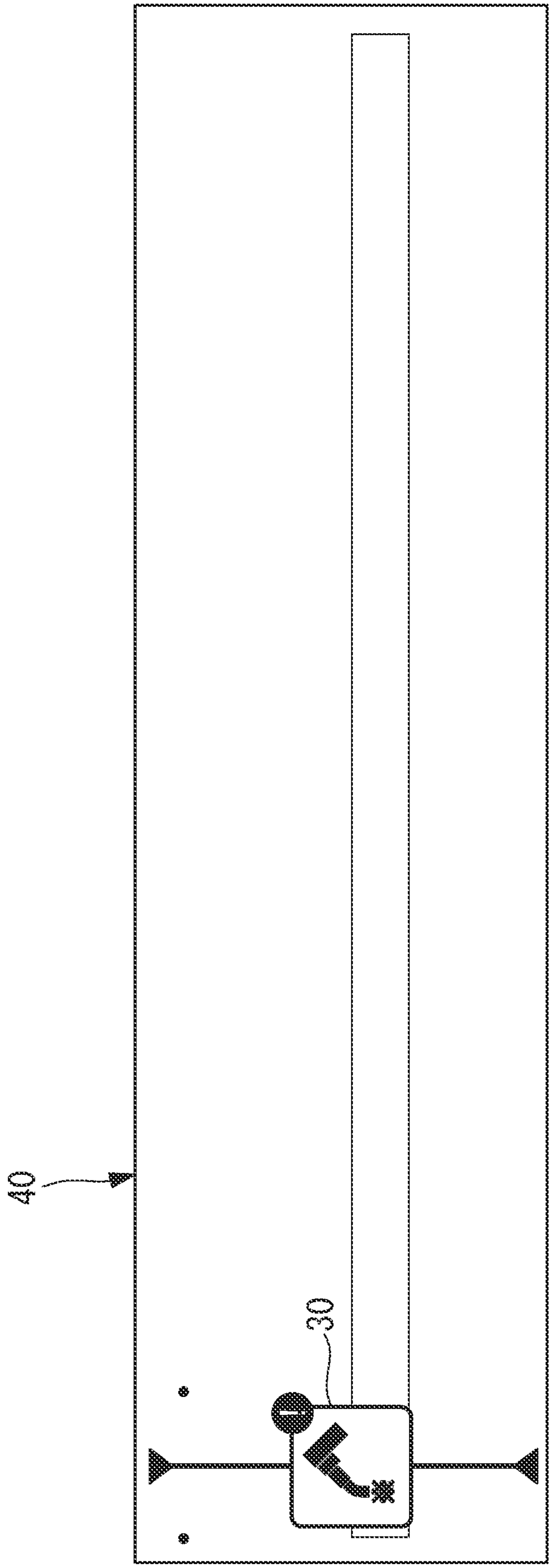
FIG. 4 is a diagram illustrating addition of the icon illustrated in FIG. 3 to a program line.

In order to perform teaching by the teaching button operation, the operator, for example, selects an icon 30 illustrated in FIG. 3 representing an external input teaching command from among the icons displayed on the monitor 22. Then, as illustrated in FIG. 4, the operator adds the selected icon 30 to the program line 40. As a result, the controller 20 recognizes signals sent by pressing the teaching button 14 in the operation device 10, and enables the teaching operation by means of the teaching button 14 in the operation device 10.

In a state where the teaching operation by means of the teaching button 14 is enabled, the operator pressing the enable switch 15 applies a force to the handles 12 and 13 to change the position and posture of the robot 1 to the desired position and posture, and then presses the teaching button 14 to cause the operation device 10 to send particular signals to the controller. By so doing, teaching points are taught. In other words, an operation command is added to the program line 40 for directing the robot 1 to a teaching point where the position and posture of the robot 1 at the time the teaching button 14 is pressed are recorded.

Figure 5:
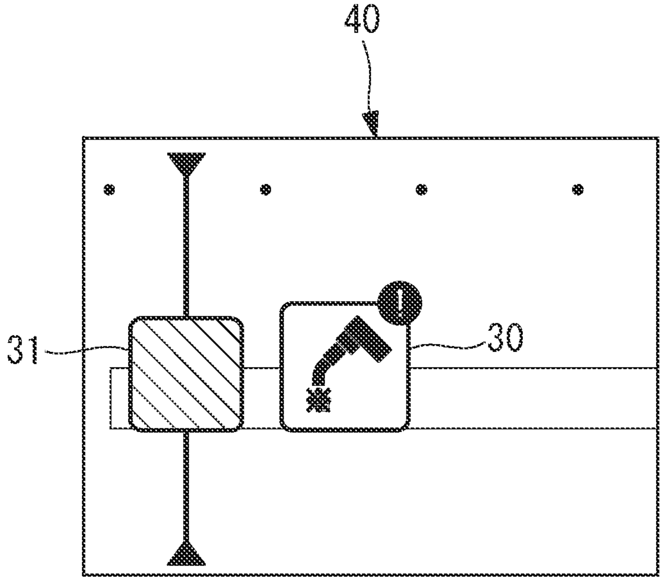
FIG. 5 is a diagram illustrating addition of a teaching content directly in front of the icon illustrated in FIG. 4 by performing a teaching operation through an operation device of the robot teaching system illustrated in FIG. 1.

As illustrated in FIG. 5, the position where the operation command is added to the program line 40 is the position where the icon 30, which represents the external input teaching command, has been displayed. When an operation command is added by pressing the teaching button 14, the icon 30 representing the external input teaching command moves back by one, for example. In this case, the icon 30 indicates the position where the next operation command is to be added when the teaching button 14 is pressed again. By repeatedly applying a force to the handles 12 and 13 of the operation device 10 to move the robot 1 and pressing the teaching button 14, icons 31 representing operation commands are sequentially added at the position of the icon 30 representing the external input teaching command, and thus the operation program in which multiple icons 30 and 31 are lined up is edited.

Figure 6:
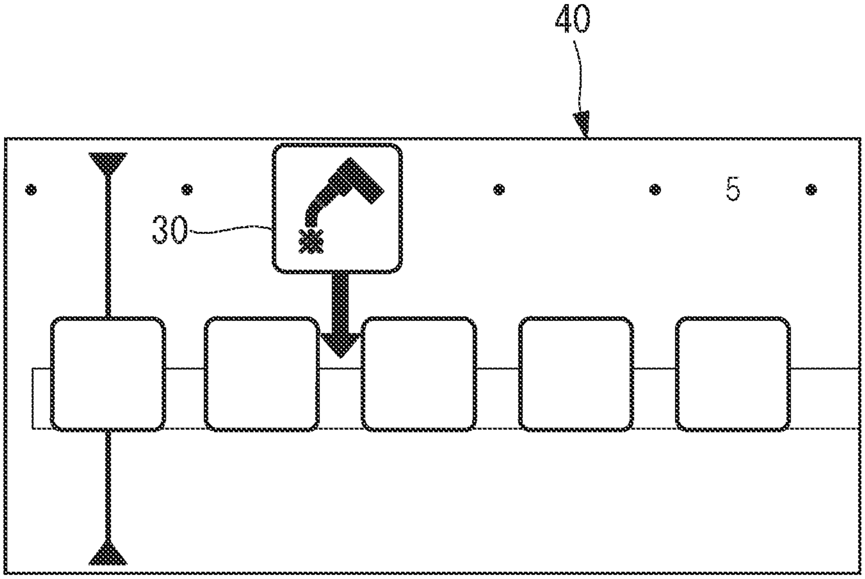
FIG. 6 is a diagram illustrating addition of an external input teaching command to an in-between position in an already existing operation program.
Figure 7:
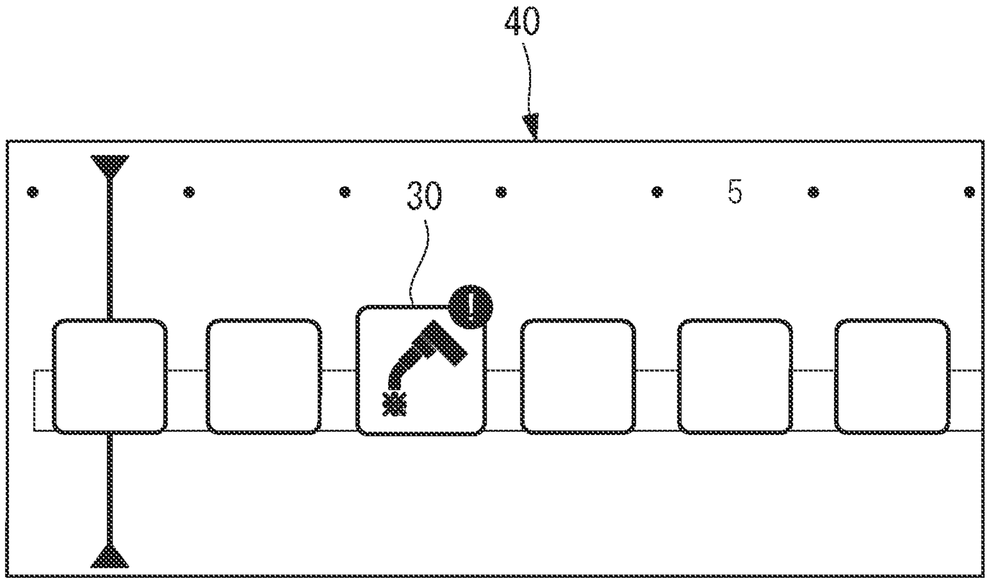
FIG. 7 is a diagram illustrating a state after the addition of the external input teaching command to the in-between position in the already existing operation program illustrated in FIG. 6.

Furthermore, in order to add operation commands by the teaching button operation to an already existing operation program, as illustrated in FIG. 6, an icon 30 representing an external input teaching command is added to the operation program displayed on the monitor 22 at a position where the operation command is intended to be added. As a result, as illustrated in FIG. 7, every time the teaching button 14 is pressed, an operation command taught by the teaching button operation is added at the position of the icon 30 representing the external input teaching command, and the icon 30 moves back by one every time the operation command is added.

In order to end the teaching operation by the teaching button operation, the operator operates the touch panel 23 or the key pad 24 in the teaching operation panel 21 to delete the icon 30 representing the external input teaching command from the program line 40. As a result, the controller 20 stops recognizing the signal sent when pressing the teaching button 14 in the operation device 10, and subsequent input operations by means of the teaching button 14 in the operation device 10 are disabled. In order to prevent the operator from forgetting to delete the icon 30 representing the external input teaching command from the program line 40, automatic operation may be forbidden as long as the icon 30 representing the external input teaching command is present on the program line 40.

As such, according to the robot teaching system 100 of this embodiment, the operation program can be edited by operating the teaching operation panel 21. Furthermore, by adding an external input teaching command to the program line 40 on the monitor 22 of the teaching operation panel 21, the operation program can be edited by using the teaching button 14 in the operation device 10.

In other words, the operator simply adds the icon 30 representing the external input teaching command to the program line 40, and this clarifies the position where an operation command is to be inserted by pressing the teaching button 14, and, at the same time, enables teaching by the teaching button operation. Furthermore, upon completion of the teaching by the teaching button operation, deleting the icon 30 representing the external input teaching command from the program line 40 can disable teaching by the teaching button operation.

By so doing, editing the operation program by using the teaching button 14 is forbidden during times other than the program editing involving adding the icon 30 representing an external input teaching command to the program line 40. As a result, issues of unintended modifications of the operation program by the operator during the automatic operation can be prevented.

In addition, the operation of enabling teaching by the teaching button operation can be carried out through a normal program editing operation of adding an icon to the program line 40. Since the operator does not have to switch between enabling and disabling the teaching by the teaching button operation with a switch operation separate from the program editing operation, there is an advantage of less inconvenience for the operator.

Furthermore, since the teaching by the teaching button operation is enabled by inserting the icon 30 representing the external input teaching command at the position where the operation command taught by the teaching button operation is to be inserted, the operation command taught by the teaching button operation can be added from any desired position in the operation program.

In addition, by pressing the teaching button 14 in the operation device 10, the operation program displayed on the monitor 22 is updated to an operation program that includes the operation command taught by the teaching button operation added to the position of the icon 30, which represents the external input teaching command.

In this manner, the operator can confirm in real-time the operation program edited by the teaching button operation. For example, if the operator has taught a wrong teaching point during the teaching button operation, looking for the icon 30 representing the external input teaching command in the operation program can instantaneously search the last-added wrong operation command and can help the operator to apply the correction quickly.

Note that this embodiment describes the case in which an operation command directed to a teaching point at which the position and posture of the robot 1 at the time of pressing the teaching button 14 are recorded is added by simply pressing the teaching button 14. Alternatively, the teaching button 14 pressing method may be modified to enable addition of operation commands in a different manner.

Figure 8:
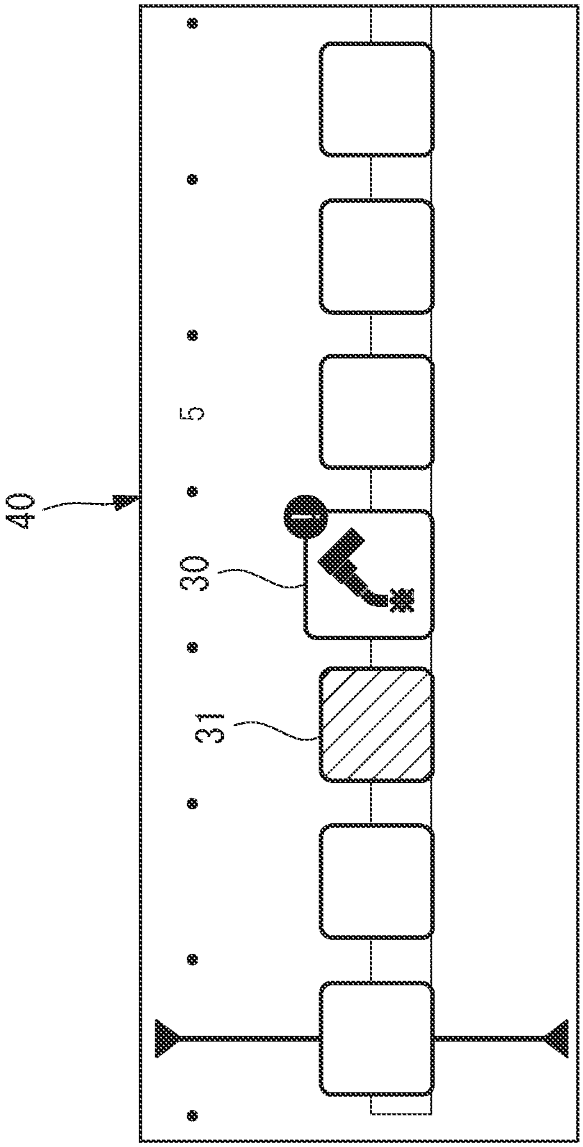
FIG. 8 is a diagram illustrating that teaching content has been added directly in front of the external input teaching command added in FIG. 7.

For example, as illustrated in FIGS. 5 and 8, in order to insert an icon 31 representing an operation command at the position of the icon 30 representing the external input teaching command, the teaching button 14 may be pressed and then immediately (for example, within 1 second) released (hereinafter, this is referred to as short pressing).

Figure 9:
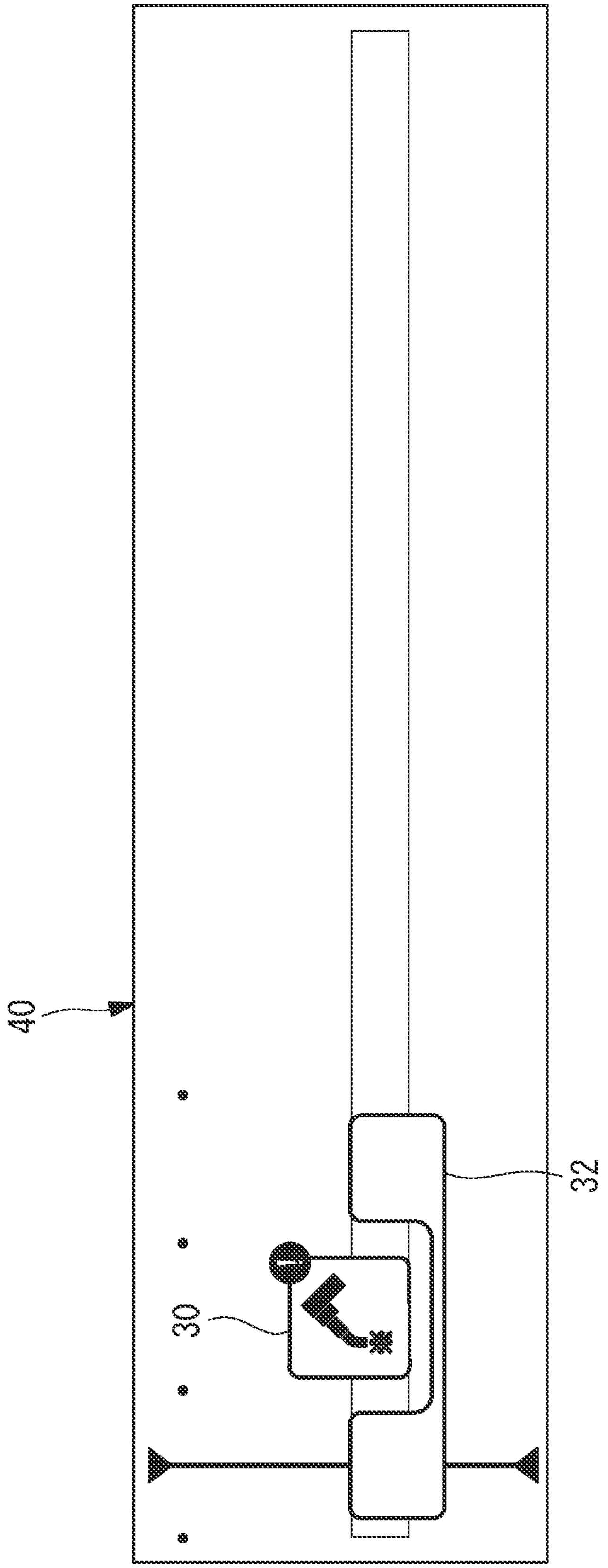
FIG. 9 is a diagram illustrating a bracket-shaped icon which is another example of the icon illustrated in FIG. 5.

Meanwhile, as illustrated in FIG. 9, by releasing the teaching button 14 after pressing for one second (hereinafter, this is referred to as long pressing), for example, a bracket-shaped icon 32 representing a start point and an end point may be displayed at the position of the external input teaching command. The icon 30 may move to a position inside the bracket-shaped icon 32 when the bracket-shaped icon 32 is inserted at a position of the icon 30 representing the external input teaching command. The bracket-shaped icon 32 is, for example, a weld command, and welding points can be taught between the start point and the end point.

Figure 10:
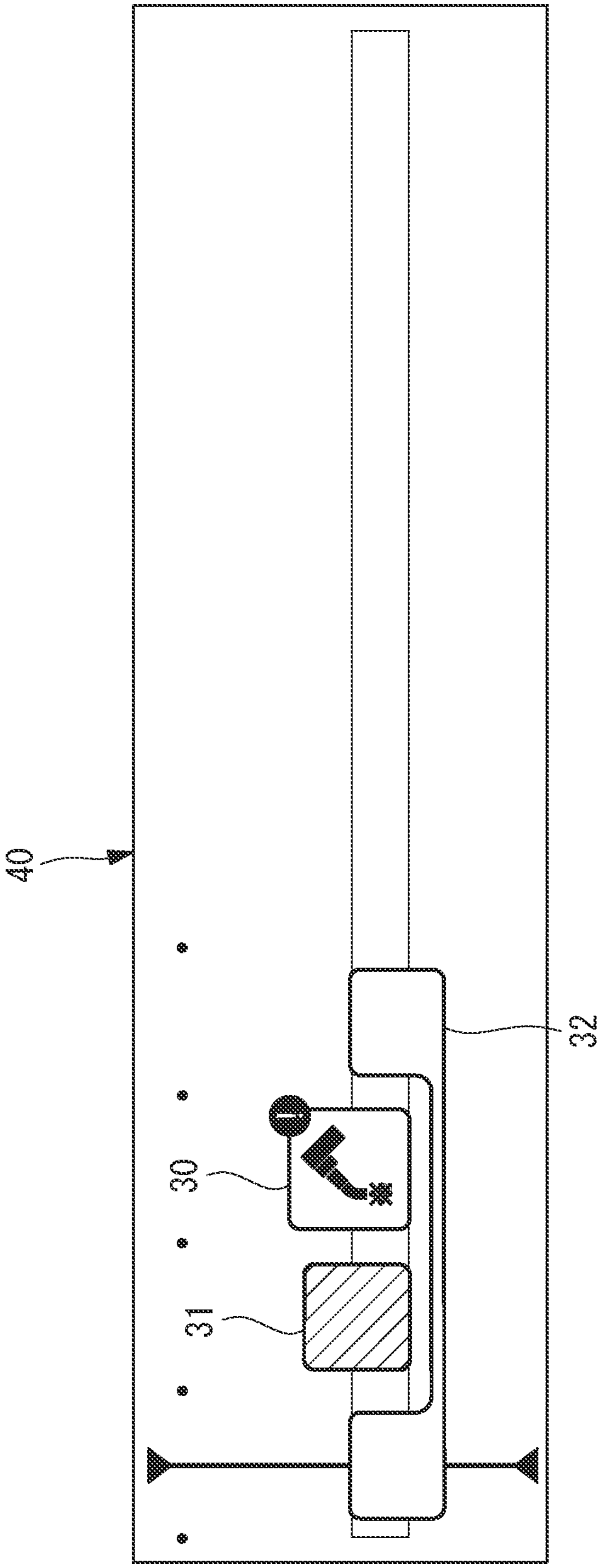
FIG. 10 is a diagram illustrating that teaching content has been added between a start point and an end point of the bracket-shaped icon illustrated in FIG. 9.
Figure 11:
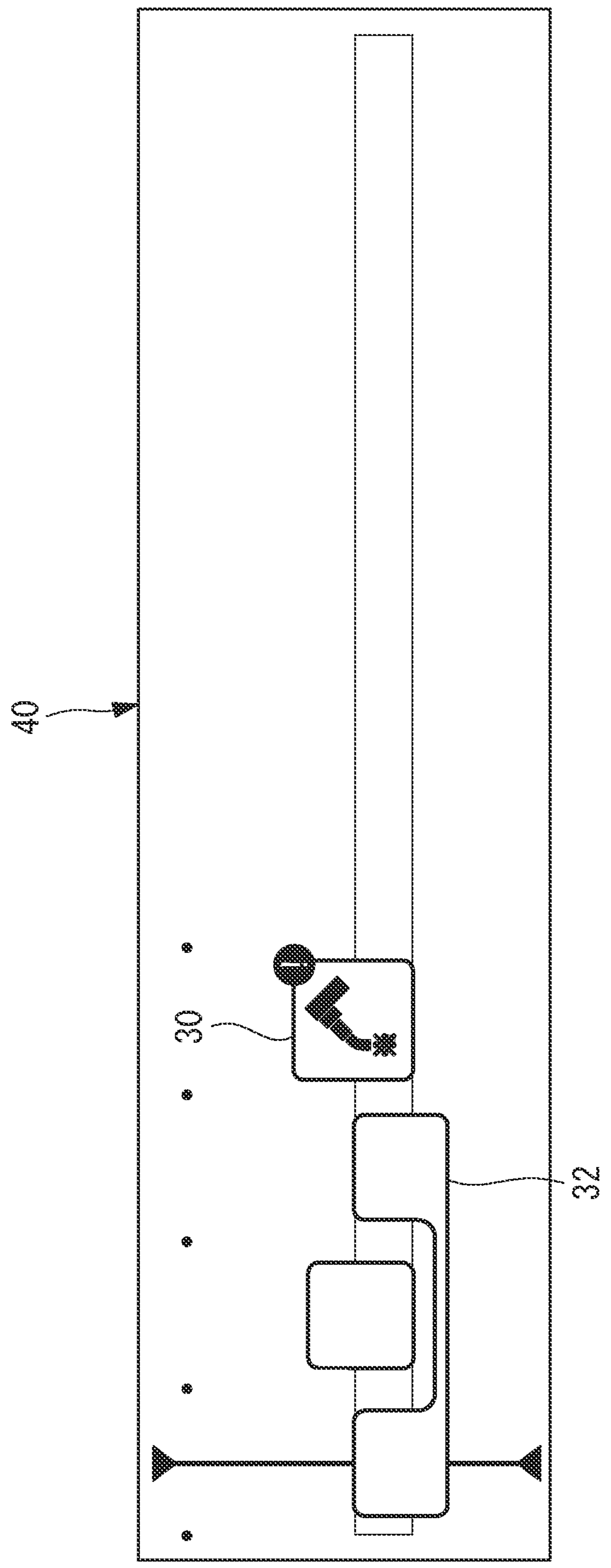
FIG. 11 is a diagram illustrating that an external input teaching command has been placed outside the bracket-shaped icon illustrated in FIG. 9.

Alternatively, as illustrated in FIG. 10, an icon 31 representing an operation command may be added at the position of the external input teaching command by short-pressing the teaching button 14 while the icon 30 representing the external input teaching command is placed inside the bracket-shaped icon 32. Here, the icon 30 may move back by one, for example. Alternatively, for example, the position of the end point of the icon 32 may be taught by long-pressing the teaching button 14 while the icon 30 representing the external input teaching command is placed inside the bracket-shaped icon 32. After teaching the end point, as illustrated in FIG. 11, the icon 30 representing the external input teaching command may be moved outside the bracket-shaped icon 32.

The operation command added by pressing the teaching button 14 and the position thereof may be specified for each application. For example, in the case of an arc welding application, the operation command may be an arc welding command or a move command to a via point during welding; and, in the case of a handling application, the operation command may be a move command to a teaching point or a hand open/close command. When selecting the icon 30 representing the external input teaching command, a detail setting screen may be displayed so that the operation command to be added by pressing the teaching button 14 can be set. The position where the external input teaching command moves to after the addition of the operation command may differ from one application to another. For example, for an application in which an action from an end point to a start point is to be taught, the external input teaching command may move forward after the addition of the operation command.

Figure 12:
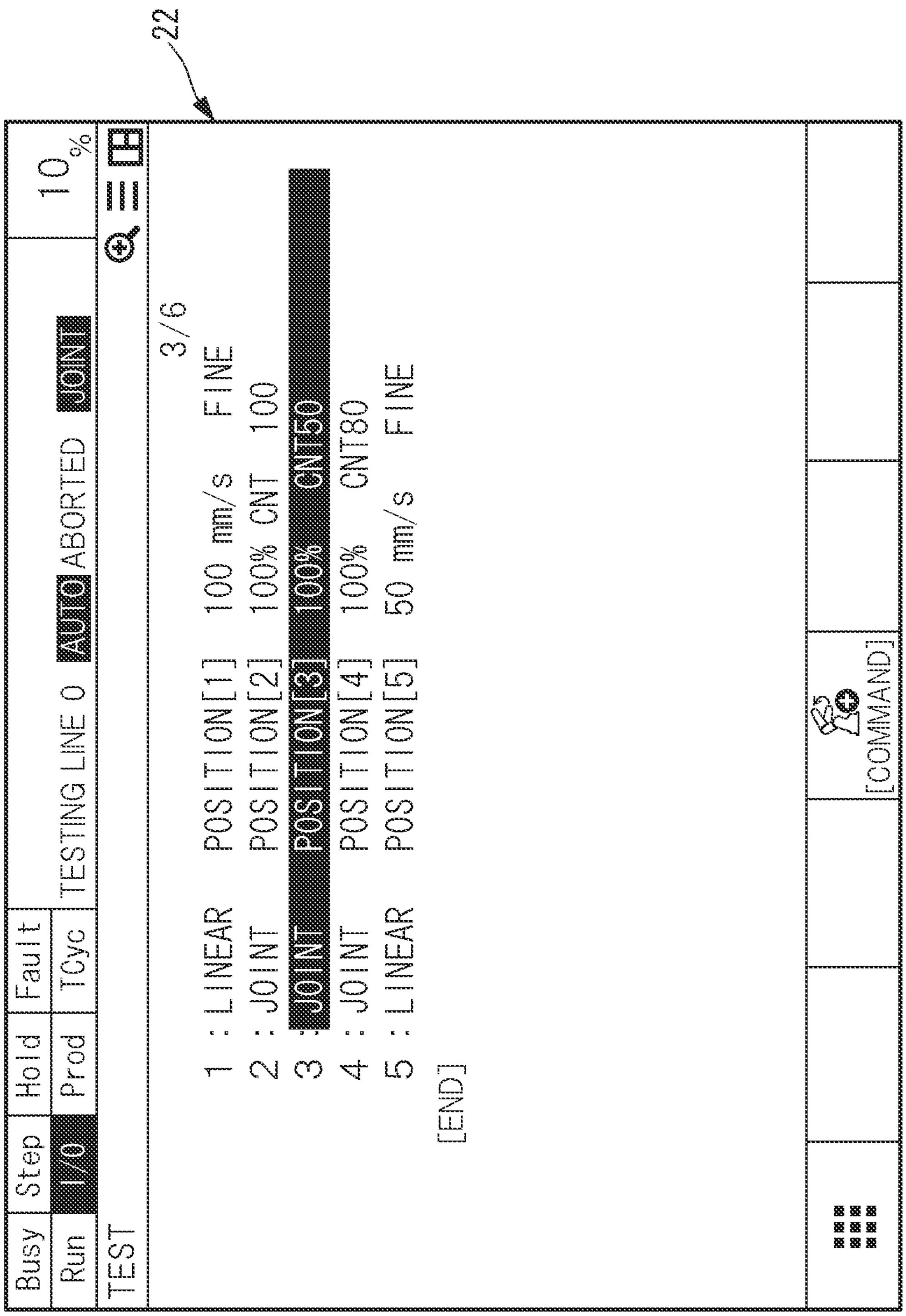
FIG. 12 is a diagram illustrating one example of an operation program configured by text-type commands instead of icons.
Figure 13:
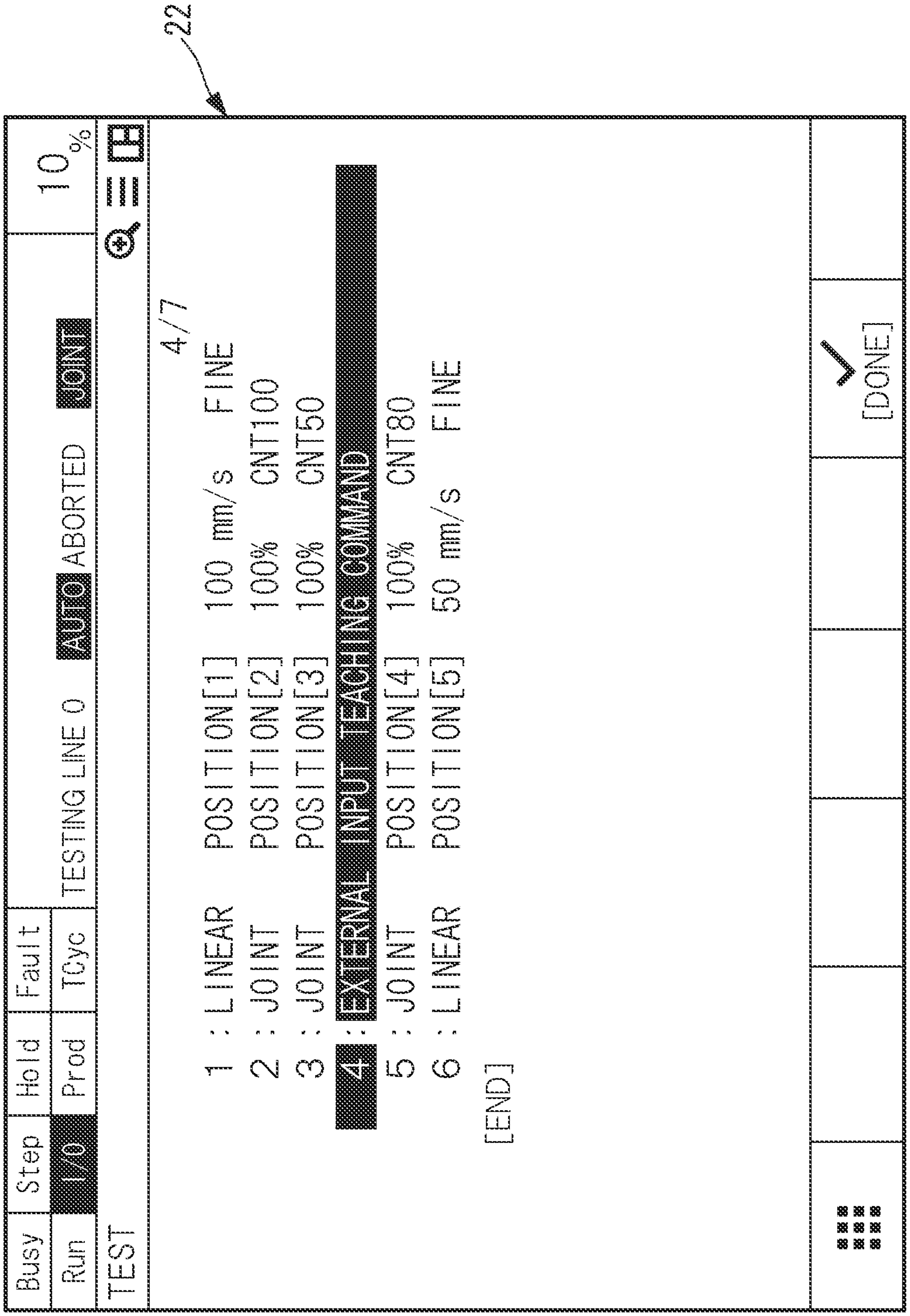
FIG. 13 is a diagram illustrating that a text-type external input teaching command has been added to an in-between position of the operation program illustrated in FIG. 12.

Although the case in which the program is indicated by lined-up icons is described as an example in this embodiment, the program may be displayed by text instead as illustrated in FIG. 12. For example, referring to FIG. 12, a list of commands that can be added may be displayed by pressing a "Command" key displayed in the lower portion of the monitor 22, and an external input teaching command may be selected from the displayed list. As a result, as illustrated in FIGS. 12 and 13, text representing an external input teaching command is added at the cursor position in the operation program, and the teaching operation by means of the teaching button 14 is enabled.

Furthermore, in this embodiment, the case in which one teaching button 14 is installed in the operation device 10 is described as an example; alternatively, multiple teaching buttons 14 may be provided. Furthermore, although the case in which the operation program that is being edited is displayed on the monitor 22 of the teaching operation panel 21 is described as an example, the monitor 22 may be included in the controller 20 or the operation device 10.

Although a 6-axis articulated robot is described as an example of the robot 1, the robot 1 may be of any other desired type. In addition, any desirable icon other than those described as examples above may be employed as the icon.

In the present embodiment, direct teaching and an operation device 10 fixed to the flange 7 are described as an example; alternatively, the robot 1 may be operated by using an operation device not fixed to the flange 7 to perform teaching. In such a case, the operation device may be linked to the controller 20 wirelessly or with wires, the operation device may be equipped with buttons for manually operating the robot 1, and the robot 1 may be operated by pressing the buttons. This operation device is equipped with a teaching button as with the operation device 10, and the operation can be performed as in the embodiment described heretofore.

Although the robot teaching system of this embodiment is described above, this system may be configurated as a program that can be executed by a computer (one or more processors).

Specifically, the program according to this embodiment includes a connection step of acquiring information indicating that an operation device 10 equipped with a teaching button 14 capable of inputting teaching contents has been connected. The program further includes a teaching command addition step of accepting addition of a particular teaching command to the operation program of the robot 1 from the teaching operation panel 21. The program further includes a teaching operation enabling step of enabling the teaching operation by means of the teaching button 14 in the operation device 10 when a teaching command is added. The program further includes an editing step of editing the operation program on the basis of the teaching content input through the teaching button 14.

The program of this embodiment may also include a teaching content addition step of adding teaching content at a position of a teaching command.

The program may further include an operation program display step of allowing a display unit to display the operation program, and the operation program display step may involve displaying the operation program on the display unit by lining-up icons specified for each command.

The program may further include a teaching operation disabling step of disabling the teaching operation of the operation device 10 when the teaching command is deleted from the operation program.

The invention claimed is:

1. A robot teaching system comprising:

a controller via which an operation program for operating a robot is editable; and an operation device that has a teaching button through which teaching content can be input and that is configured to connect to at least the controller, wherein, when a particular teaching command is added to the operation program, the controller is configured to enable a teaching operation by means of the teaching button, switch to an operation mode in which the controller accepts the teaching content input from the teaching button to edit the operation program, and edit the operation program on a basis of the teaching content input through the teaching button.

2. The robot teaching system according to claim 1, wherein the controller further comprises a display that displays the operation program.

3. The robot teaching system according to claim 2, wherein the controller is further configured to add the teaching content at a position of the teaching command displayed on the display.

4. The robot teaching system according to claim 2, wherein, when the teaching content is input by the teaching button, the controller is further configured to display, on the display, the operation program having the input teaching content added thereto.

5. The robot teaching system according to claim 2, wherein the controller is further configured to display, on the display, the operation program by lining-up icons specified for each command.

6. The robot teaching system according to claim 1, wherein, when the teaching command is deleted from the operation program that is being edited by the controller, the controller is further configured to disable the teaching operation by the teaching button.

7. A program generation device comprising:

at least one memory to store at least one operation program for operating a robot; and at least one processor coupled to the at least one memory, the at least one processor being configured to:

after a predetermined teaching command is added to the at least one operation program, obtain information in relation to teaching content input through an operation device; and edit the at least one program based on the obtained information in relation to teaching content, wherein the predetermined teaching command is a command for causing the at least one processor to transition to an operation mode for receiving the teaching content input from a teaching button of the operation device and editing the at least one operation program.

8. The program generation device according to claim 7, wherein the at least one processor is further configured to display the at least one operation program on a display.

9. The program generation device according to claim 8, wherein the at least one processor is further configured to add the teaching content at a position of the teaching command displayed on the display.

10. The program generation device according to claim 8, wherein, when the teaching content is input through the operation device, the at least one processor is further configured to display, on the display, the at least one operation program having the input teaching content added thereto.

11. The program generation device according to claim 8, wherein the at least one processor is further configured to display, on the display, the at least one operation program by lining-up icons specified for each command.

12. The program generation device according to claim 7, wherein, when the teaching command is deleted from the at least one operation program that is being edited, the at least one processor is further configured to disable the teaching operation.

13. The program generation device according to claim 7, wherein, when the predetermined teaching command is input to the at least one operation program, the at least one processor is further configured to enable a teaching operation by means of the operation device.

14. A program generation device comprising:

at least one memory to store at least one operation program for operating a robot; and at least one processor coupled to the at least one memory, the at least one processor being configured to:

when a predetermined teaching command is added to the at least one operation program, enable a teaching operation by an operation device; and edit the at least one operation program based on a teaching content input through the operation device, wherein the predetermined teaching command is a command for causing the at least one processor to transition to an operation mode for receiving the teaching content input from a teaching button of the operation device and editing the at least one operation program.

15. The program generation device according to claim 14, wherein the at least one processor is further configured to display the at least one operation program on a display.

16. The program generation device according to claim 15, wherein the at least one processor is further configured to add the teaching content at a position of the teaching command displayed on the display.

17. The program generation device according to claim 14, wherein, when the teaching command is deleted from the at least one operation program that is being edited, the at least one processor is further configured to disable the teaching operation.

18. The program generation device according to claim 14, wherein, after the predetermined teaching command is added to the at least one operation program, the at least one processor is further configured to obtain information in relation to the teaching content input through the operation device.

* * * * *